Figure 1:
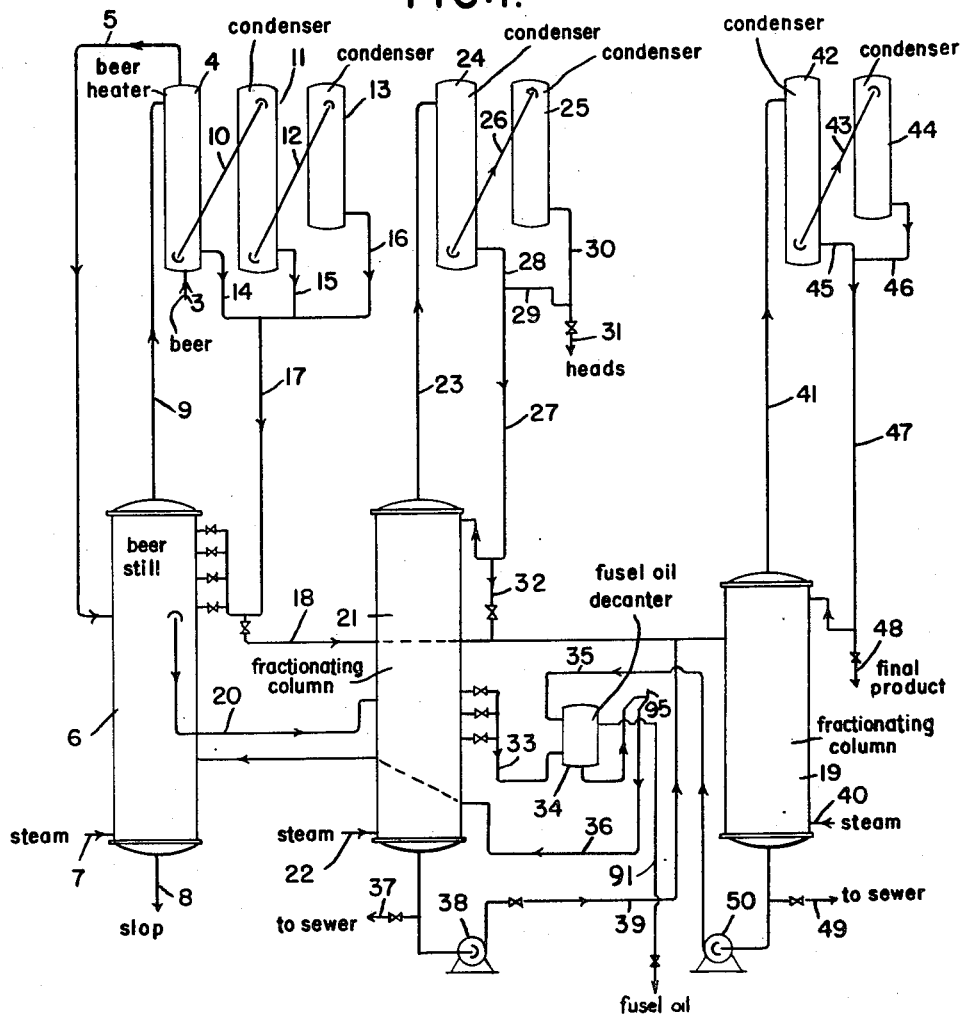

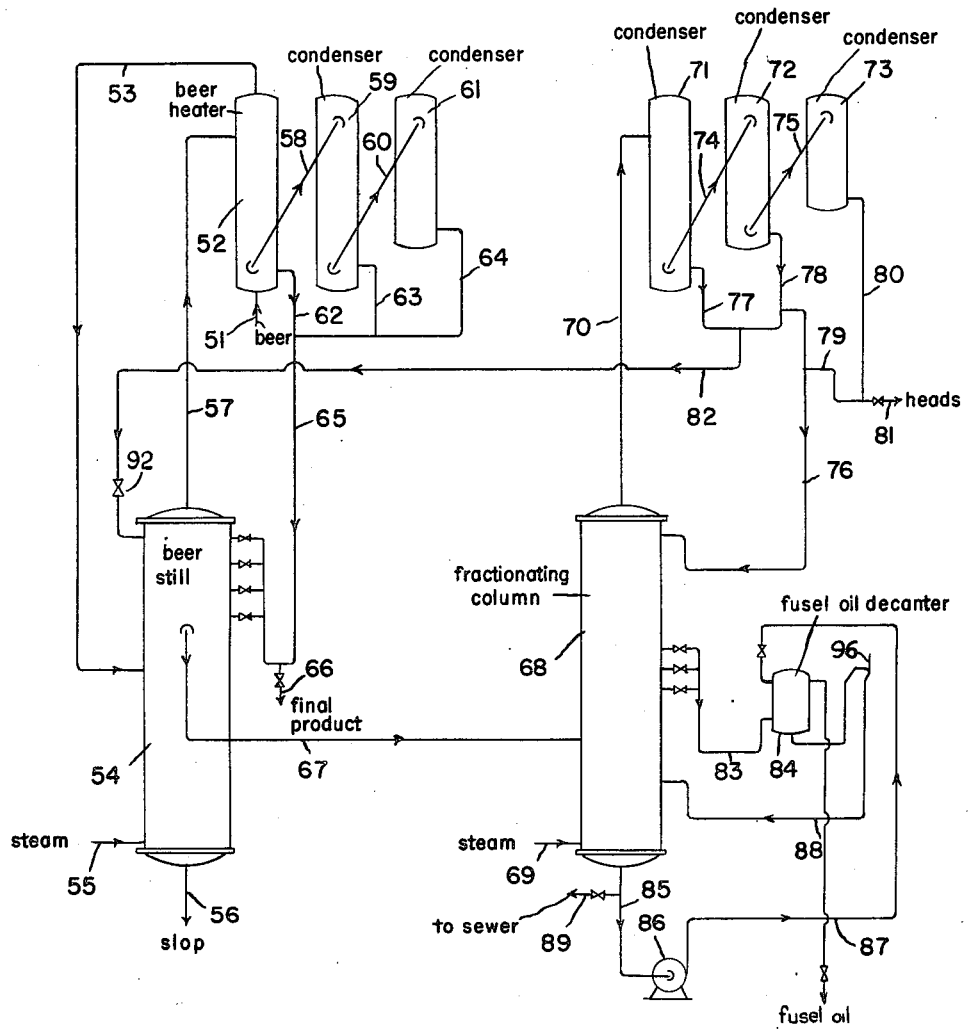

Patented July 8, 1952

2,602,744

UNITED STATES PATENT OFFICE 2,602,744

PROCESS FOR PRODUCING WHISKY

George Charles Neureuther, Morton, Ill.

Application July 31, 1948, Serial No. 41,870

5 Claims. (Cl. 99—34)

This invention relates to a process for continuously produced whisky from a fermented alcoholic mash, and particularly to improvements in such a process whereby the composition, body, character and quality of the whisky may be controlled within broad limits to provide a final whisky product of desired characteristics.

Under present methods for distilling whisky the quality, character and composition of the final whisky distillate, within very narrow limits, are very largely controlled by the composition of the beer (alcoholic distillers mash) from which the whisky is distilled. Present standard practices for distilling whisky, for the most part, fall under one or the other of two standard procedures. Under one of these procedures the beer is distilled in a conventional beer still which is operated in such a manner as to hold the proof of the product between 110 and 158. The vapors from the beer still pass through a scrubbing chamber, known as a doubler, prior to condensation and removal as the final whisky product. Although it is essentially true that the higher the proof at which the whisky is distilled, the lighter will be the body, it is well recognized that only some of the deleterious ingredients are removed in this manner, since all of the volatile congeners, including fusel oil, eventually distil into the final product since they can be removed from the system only in the vapor phase i. e. as an overhead product. The effluent from the doubler is usually returned to the beer still, and consequently the materials scrubbed from the vapors in the doubler are returned to the system.

The second procedure presently practiced embodies most of the steps of the first procedure just described, but in addition the product from the beer still undergoes a further step known as redoubling. Under this procedure the vapors from the beer still are condensed and the condensate is then charged into a kettle heated with steam coils. The vapors from this kettle are condensed and the condensate is sent to the product tank. When the proof of the distillate from said kettle reaches some pre-determined value, usually between 60 and 120, the balance of the material, known as tailings, is sent to a tank to be recharged to the kettle with a new batch from the beer still. Obviously after a few recycles more and more of the tailings are getting into the whisky and there is progressively less uniformity in the final whisky product. Consequently, as already mentioned, within very restricted limits the quality, character and composition of the whisky distillate under either of the present practices are very largely controlled by the characteristics of the beer.

By virtue of the improvements constituting the present invention I have found that without resorting to the use of any new type of distillation equipment, but by simply using standard equipment, it is possible to carry out the distillation in such a way that heads fractions and tails fractions are uniformly and continuously removed from the system so that the composition and quality of the whisky are not changed by recycling, thereby avoiding the lack of uniformity encountered under present practices. These improvements also make it possible to distil a whisky which will not only be uniform in quality but which will also have desired characteristics in respect of body and bouquet depending upon the extent to which the product, during its passage through the system, is subjected to treatment for removal of certain ingredients present in the vapors which leave the beer still.

Two typical embodiments of my invention are shown in the accompanying drawings, wherein I have shown in diagrammatic form two arrangements of apparatus for carrying out the invention, Fig. 1 being a diagrammatic illustration of an arrangement which makes use of a beer still and two fractionating columns, and Fig. 2 showing an arrangement which makes use of but one fractionating column in addition to the beer still.

Referring first to Fig. 1 of the drawings, beer (alcoholic distillers mash) containing from about 5% to 8% alcohol by volume and the customary impurities i. e. heads, tails, and esters, is pumped through a pipe 3 to a beer heater 4 in which it is heated to a temperature anywhere between 90° and 200° F. The beer thus pre-heated is carried through a pipe 5 into the upper part of a beer still 6 which may be a conventional sieve plate column, operating at atmospheric pressure or at any desired pressure, heat for the distillation being supplied by introduction of live steam at the base of the still through a steam line 7. The function of the beer still is to completely exhaust from the mash the alcohol together with the congeners i. e. heads (aldehydes and other low boiling fractions), tails (fusel oil and other high boiling fractions) and esters. The exhausted slop is withdrawn from the base of the still through a draw-off line 8. The vapors from the top of beer still 6, containing heads, tails and esters, with an alcoholic concentration of from about 50% to 78% by volume, and at a temperature of from about 188° to 205° F. pass through a pipe 9 to beer heater 4 which is connected by a pipe 10 to a condenser 11, the latter in turn being connected by a pipe 12 with a second condenser 13. The vapors condensed in beer heater 4 and in condensers 11 ad 13 flow through pipes 14, 15 and 16, respectively, to a return line 17 through which the liquid flows as reflux to beer still 6. However the entire condensate flowing through pipe 17 is not returned as reflux to beer still 6, but, in accordance with my invention, a pre-determined portion is withdrawn through a line 18 to a fractionating column 19, which might be appropriately described as a finished product column, the operation of which will hereinafter be described. The proportion of the condensate from beer still 6 which is drawn off through line 18 without being refluxed will depend upon the characteristics which are desired in the final whisky product. Other conditions in the system being the same, the larger the proportion of such condensate which is thus diverted from the reflux returned to beer still 6, the heavier will be the body of the final whisky product.

As already noted, the remainder of the liquid from pipe 17 is refluxed down the wine plates of beer still 6. From the first wine plate above the beer feed plate this refluxed liquid is withdrawn in its entirety through a pipe 20 and fed to a fractionating column 21 at a point about midway of said column. Column 21 may be a standard bubble cap type column. Its function is to remove the fusel oil constituents of the high boiling congeners from the alcoholic liquid supplied to it from the beer still. The column is heated by introducing live steam at the base through a steam line 22. If desired a closed steam heating unit may be used in lieu of live steam. The temperature at the base of this column is about 220° F. and at the top it is about 175° F. As the vapors rise through the column they become richer in alcohol until at the top of the column they consist of around 95% to 96% alcohol by volume plus all the low boiling congeners i. e. heads and low boiling esters.

The vapors from the top of column 21 travel through a pipe 23 to condensers 24 and 25 which are connected by a pipe 26. The condensed vapors are returned as reflux to column 21 through a pipe 27 which connects with condensers 24 through a pipe 28 and with condensers 25 through pipes 29 and 30. A desired amount of heads fraction may be removed from condensers 24 and 25 through a draw-off line 31. Only a portion of the condensate from column 21 is returned thereto as reflux. The remainder, instead of being refluxed to column 21, is drawn through a line 32 which connects with line 18 through which it passes, along with the non-refluxed portion of the condensate from beer still 6, to fractionating column 19, the action of which will presently be described.

Considering the action of fractionating column 21, the fusel oils present in the liquid supplied to this column through line 20 are completely soluble in alcohol, and since they have higher boiling points than that of alcohol, tend to work their way toward the base of the column. However these fusel oils, being only partially soluble in water, and therefore volatile with steam when present in excess of their solubility limits, tend to distil up through the column. Since these oils cannot go out of either the top or the bottom of column 21 they are trapped at about the center, from whence they are removed through a line 33 to a decanter 34 where they are separated from the aqueous layer and removed from the system through a draw-off line 91. Water is supplied to decanter 34 through a pipe 35 and the aqueous portion which settles to the bottom of the decanter is returned through a pipe 36 to the middle or lower part of beer still 6. A vent pipe 95 in line 36 prevents the decanter from siphoning empty. The effluent from column 21 may be sent to the sewer through a pipe 37, or it may be fed by a pump 38 through a pipe 39 to line 18 as further feed to column 19.

Considering now the operation of the fractionating or finished product column 19, the purpose of this column is to exhaust all the alcohol from the liquid supplied to it through line 18 and to permit the finished product to be withdrawn from the system at the desired alcoholic strength. The temperature at the top of this column will be from about 187° to 200° F. and will be about 220° F. at the base. Heat is supplied to this column by means of open steam introduced through a line 40. The vapors from the top of the column 19 are at an alcoholic concentration of from about 50% to 79% by volume and travel through a pipe 41 to a condenser 42 which connects through a pipe 43 with a second condenser 44. The condensates from condensers 42 and 44 are drawn off through pipes 45 and 46 respectively, which connect with a line 47 through which the liquid is returned as reflux to the top of column 19. A portion of this reflux is withdrawn through a line 48 as the final whisky distillate. The effluent from column 19, completely free of alcohol, is sent to the sewer through a line 49. A portion of this effluent, consisting only of water, may be fed by a pump 50 through line 35 to supply the washing water to fusel oil decanter 34.

The composition and quality of the final whisky distillate drawn off through line 48 will depend upon the extent to which the condensate from beer still 6 is directed to column 19 without first being treated for removal of fusel oil and heads fraction. The system thus admits of broad control of the characteristics of the final whisky distillate. Also it avoids the objectionable accumulation in the whisky of tailings which arises because of the recycling which occurs under present procedures. The fusel oils extracted in column 21 are removed from the system and thus have no opportunity to get into the final product. Also, the heads fraction which is drawn off through pipe 31 is removed from the system at a point in advance of where it can get into the final product. The system thus admits of attainment of more uniformity in the final product and at the same time affords wide control of the composition and quality of the final whisky distillate.

Considering next the arrangement shown in Fig. 2, which makes use of one less column, the beer, containing from 5% to 8% alcohol by volume is pumped through a line 51 to a beer heater 52 in which it is heated to any temperature from about 90° F. to 200° F. The beer thus preheated is carried through a pipe 53 to a beer still 54 which, as in Fig. 1, may be a conventional sieve plate column operating at atmospheric pressure or at any desired pressure, heat for distillation being supplied by introduction of live steam at the base of the still through a steam line 55. The exhausted slop is withdrawn from the base of the still through a pipe 56. The vapors from the top of the beer still 54 containing the congeners, and at an alcoholic concentration of from about 50% to 78% by volume, and at a temperature of from about 188° to 200° F., pass through a pipe 57 to beer heater 52, thence through a pipe 58 to a condenser 59 and finally through a pipe 60 to a second condenser 61. The condensate from beer heater 52, condensers 59 and 61 flows through pipes 62, 63 and 64 respectively, to a line 65 which returns the condensate as reflux to beer still 54. In accordance with this embodiment of my invention a predetermined portion of this reflux is withdrawn as the final whisky product through a line 66.

The remainder of the liquid from line 65 is refluxed down the wine plates of beer still 54, and from the first wine plate above the beer feed plate this liquid is withdrawn in its entirety through a line 67 and fed to about the midpoint of fractionating column 68. Column 68 is a standard bubble cap type column corresponding to column 21 of Fig. 1, and serves to remove the fusel oil constituents of the high boiling congeners from the alcoholic liquid fed to it. The temperature at the base of this column is about 220° F. and at the top about 175° F. Heat to effect evaporation is supplied by means of open or closed steam introduced through a line 69. As the vapors rise through the column they become richer in alcohol so that at the top they consist of about 95% to 96% alcohol by volume, plus all the low boiling congeners i. e. heads and low boiling esters. The vapors from the top of column 68 travel through a pipe 70 to condensers 71, 72, and 73, the first two being connected by a pipe 74 and the last two by a pipe 75. The condensates from condensers 71, 72 and 73 may be returned as reflux to column 68 through line 76 which connects with condensers 71 through a pipe 77, with condenser 72 through a pipe 78, and with condenser 73 through pipes 79 and 80. A desired quantity of heads fraction may be removed from the system through line 81.

In accordance with this embodiment of my invention I provide a line 82 which connects pipes 77 and 78 to the top of beer still 54. The purpose of line 82 is to provide means for returning all, or desired portions of, the condensates from condensers 71 and 72 to the top of beer still 54. This is accomplished by controlling the amount of cooling water which flows to condensers 71, 72 and 73. If the amount of cooling water flowing to condenser 73 is always sufficient to condense whatever vapors come to it, which is normally the case, then the flow of condensate through line 82 to beer still 54 depends on the amount of condensate produced in condensers 71 and 72, and of course the amount of condensate which flows to line 76 from condenser 73 through lines 80 and 79 depends on the amount of heads drawoff through line 81. Thus, under normal conditions of operation, with sufficient cooling water flowing to condenser 73 to completely condense all vapors flowing thereto, part or all of the condensate from condenser 71, and part or all of the condensate from condenser 72 may be returned through 82 to beer still 54, depending upon the amount of cooling water which is allowed to flow to condensers 71 and 72. When all of the condensate from condenser 71 is being returned through lines 77 and 82 to beer still 54, part or all of the condensate from condenser 72 can likewise be returned through lines 78 and 82 to beer still 54. However if only part of the condensate from condenser 71 is being returned to beer still 54 then none of the condensate from condenser 72 can be returned to beer still 54 because under these conditions the part of the condensate from condenser 71 which is not returned to beer still 54 will flow through line 77 to line 76, thus preventing any portion of the condensate from condenser 72 flowing into line 82. Any part of the condensate from condensers 71 and 72 which does not flow to beer still 54 will overflow as reflux into fractionating column 68 through lines 77, 78 and 76. Or a valve 92 may be provided in line 82 and thereby any condensate from condensers 71 and 72 that is not returned to beer still 54 through valve 92 in line 82 is returned as reflux to column 68. Thus it will be apparent that in this embodiment the composition and quality of the final product may be controlled by regulating the proportionate part of the condensate from the beer still which is treated for removal of the fusel oil constituents of the high boiling congeners and a desired portion of the heads fraction. Other conditions in the system remaining the same, the larger the portion of such condensate which is thus treated, the lighter will be the body of the final whisky distillate drawn off through pipe 66.

The operation of fractionating column 68 is similar to the operation of the corresponding column 21 in the arrangement of Fig. 1. The fusel oils present in the liquid fed to this column through line 67 are completely soluble in alcohol, and having a higher boiling point than alcohol, tend to make their way toward the base of the column. However, these oils, being only partially soluble in water, and therefore volatile with steam when present in excess of their solubility limits, tend to distil up the column. However, since they can neither go out of the top nor out of the bottom of said column they are trapped at the center and are drawn off through a line 83 to a fusel oil decanter 84, where they are separated from the aqueous layer and removed from the system through a draw-off line 93. Water is supplied to decanter 84 from the bottom of column 68 through a pipe 85 which connects the bottom of the column with a pump 86, the latter being connected with decanter 84 by a pipe 87. The aqueous portion which settles to the bottom of the decanter is returned to column 68 through a line 88. The effluent from column 68, being only water, is in part sent to the sewer through a line 89 which connects with pipe 85, the balance of the water effluent being supplied to decanter 84 as already described. This fractionating column 68 removes completely the fusel oils from the liquid feed supplied to it from the beer still through line 67.

It will thus be apparent that in the arrangement shown in Fig. 2, just as in the arrangement shown in Fig. 1, it is possible to control the composition and quality of the final whisky distillate within broad limits. The arrangement in Fig. 2 has an advantage over the arrangement of Fig. 1 in that it utilizes one less column to do the job. However, the arrangement of Fig. 1 is the preferred one because it permits of greater flexibility in operation and allows a much closer control over the resulting product. The arrangement of Fig. 2 would preferably be run more or less on a specific whisky, inasmuch as a change in the characteristics of the whisky distillate could not be accomplished quite as conveniently as with the arrangement of Fig. 1. However, even in the arrangement of Fig. 2 I avoid the objectionable recycling of the present methods and the accompanying lack of uniformity in product which results from such recycling.

In this arrangement, just as in the arrangement of Fig. 1, the heads and tails fractions may be uniformly and continuously removed so that the composition and quality of the whisky are not changed by recycling.

It will be understood that the examples herein described are only to be considered as illustrative of preferred embodiments of the invention given to explain the principles involved in the new process, and that the invention is not to be construed as limited to the details of these specific embodiments.

What I regard as new and desire to secure by Letters Patent is:

1. In a continuous process for producing whisky the steps which comprise introducing a fermented alcoholic mash, which contains alcohol and also congeners some of which are of higher, and others of lower, boiling point than that of alcohol, into a distilling column while supplying heat to the column, thereby vaporizing the alcohol and congeners contained in the mash, conducting the alcohol and congener vapors from said column to a condenser to produce a distilling column condensate containing both the alcohol and the higher and lower boiling congeners, dividing said distilling column condensate into a first portion and a second portion, refluxing the first condensate portion to the distilling column and then withdrawing from said column a reflux fraction as a liquid, feeding said reflux fraction thus withdrawn from the distilling column to a first fractionating column while supplying heat to said first fractionating column, thereby vaporizing the alcohol and lower boiling congeners to separate them from the fusel oil constituents of the higher boiling congeners, drawing off the fusel oil constituents from the first fractionating column, conducting the alcohol and lower boiling congener vapors from said first fractionating column to a condenser to produce a first fractionating column condensate containing both the alcohol and the lower boiling congeners, dividing said condensate into a first portion and a second portion, refluxing the first condensate portion from the last-mentioned condenser to the first fractionating column, feeding the second condensate portion from the last-mentioned condenser, along with the second condensate portion of the distilling column condensate, to a second fractionating column while supplying heat to the column, thereby vaporizing the alcohol and any lower and higher boiling congeners still remaining in said second condensate portions of the distilling column condensate and of the first fractionating column condensate, conducting the vapors from the second fractionating column to a condenser to produce a condensate rich in alcohol, refluxing a portion of said last-mentioned condensate to the second fractionating column, and withdrawing the remainder thereof as a final whisky distillate the composition and quality of which are determined in accordance with the relative proportions into which the distilling column condensate is divided into said first and second portions.

2. In a continuous process for producing whisky the steps which comprise introducing a fermented alcoholic mash, which contains alcohol and also congeners some of which are of higher, and others of lower, boiling point than that of alcohol, into the upper zone of a distilling column while supplying heat to the column, thereby vaporizing the alcohol and congeners contained in the mash, conducting the alcohol and congener vapors from the head of said column to a condenser to produce a distilling column condensate containing both the alcohol and the higher and lower boiling congeners, dividing said distilling column condensate into a first portion and a second portion, refluxing the first condensate portion to the head of the distilling column and then withdrawing a reflux fraction as a liquid from a point lower down in the column, but above the point of mash feed, feeding said reflux fraction thus withdrawn from the distilling column to a first fractionating column while supplying heat to the first fractionating column, thereby vaporizing the alcohol and lower boiling congeners to separate them from the fusel oil constituents of the higher boiling congeners, drawing off the fusel oil constituents from the point in the first fractionating column where they are trapped and accumulate, conducting the alcohol and lower boiling congener vapors from the head of said first fractionating column to a condenser to produce a first fractionating column condensate containing both the alcohol and the lower boiling congeners, withdrawing a predetermined portion of said first fractionating column condensate as a heads fraction and dividing the remainder of said condensate into a first portion and a second portion, refluxing the first condensate portion from the last-mentioned condenser to the head of the first fractionating column, feeding the second condensate portion from the last-mentioned condenser, along with the second condensate portion of the distilling column condensate, to a second fractionating column while supplying heat to the column, thereby vaporizing the alcohol and any lower and higher boiling congeners still remaining in said second condensate portions of the distilling column condensate and of the first fractionating column condensate, conducting the vapors from the head of said second fractionating column to a condenser to produce a condensate rich in alcohol, refluxing a portion of said last-mentioned condensate to the top of the second fractionating column, and withdrawing the remainder thereof as a final whisky distillate the composition and quality of which are determined in accordance with the relative proportions into which the distilling column condensate is divided into said first and second portions.

3. In a continuous process for producing whisky the steps which comprise introducing a fermented alcoholic mash, which contains alcohol and also congeners some of which are of higher, and others of lower, boiling point than that of alcohol, into a distilling column while supplying heat to the column, thereby vaporizing the alcohol and congeners contained in the mash, conducting the alcohol and congener vapors from said column to a condenser to produce a distilling column condensate containing both the alcohol and the higher and lower boiling congeners, dividing the condensate thus obtained into a first portion and a second portion, refluxing the first condensate portion to the distilling column and then withdrawing a reflux fraction as a liquid, feeding said reflux fraction thus withdrawn from the distilling column to a fractionating column while supplying heat to the column, thereby vaporizing the alcohol and lower boiling congeners to separate them from the fusel oil constituents of the higher boiling congeners, drawing off the fusel oil constituents from the fractionating column, conducting the alcohol and lower boiling congener vapors from said fractionating column to a condenser to condense the alcohol and lower boiling congener vapors as they pass therethrough, withdrawing a predetermined portion of the condensate obtained from the fractionating column condenser as a heads fraction, refluxing a predetermined portion of the remainder of said fractionating column condensate to the fractionating column, feeding the remaining portion of the fractionating column condensate to the distilling column, and withdrawing the second condensate portion of the distilling column condensate as a final whisky distillate the composition and quality of which are determined in accordance with the relative proportions into which the distilling column condensate is divided into said first and second portions.

4. In a continuous process for producing whisky the steps which comprise introducing a fermented alcoholic mash, which contains alcohol and also congeners some of which are of higher, and others of lower, boiling point than that of alcohol, into the upper zone of a distilling column while supplying heat to the column, thereby vaporizing the alcohol and congeners contained in the mash, conducting the alcohol and congener vapors from the head of said column to a condenser to produce a distilling column condensate containing both the alcohol and the higher and lower boiling congeners, dividing the condensate thus obtained into a first portion and a second portion, refluxing the first condensate portion to the head of the distilling column and then withdrawing a reflux fraction as a liquid from a point lower down in the column, but above the point of mash feed, feeding said reflux fraction thus withdrawn from the distilling column to a fractionating column while supplying heat to the column, thereby vaporizing the alcohol and lower boiling congeners to separate them from the fusel oil constituents of the higher boiling congeners, drawing off the fusel oil constituents from the point in the fractionating column where they are trapped and accumulate, conducting the alcohol and lower boiling congener vapors from the head of said fractionating column to a multiple unit condenser to progressively condense the alcohol and lower boiling congener vapors as they pass therethrough, withdrawing a predetermined portion of the condensate obtained from the final unit of the multiple condenser as a heads fraction and refluxing the remainder of said last-mentioned condensate to the head of the fractionating column, feeding all or predetermined portions of the condensates obtained from the other units of the multiple condenser to the head of the distilling column, any portions of the last-mentioned condensates not fed to the distilling column being refluxed to the head of the fractionating column, and withdrawing the second condensate portion of the distilling column condensate as a final whisky distillate the composition and quality of which are determined in accordance with the relative proportions into which the distilling column condensate is divided into said first and second portions.

5. A continuous distillation process for producing whisky which comprises the steps of introducing a fermented alcoholic mash, which contains alcohol and also congeners, some of which are of higher and some of lower boiling points than that of alcohol, into a distilling column at an intermediate point, supplying heat to said column to distill therefrom vapors containing alcohol and associated congeners, the alcohol content of said vapors being such as to form a condensate of from 50 to 78 volume percent alcohol, condensing the distilled vapors and refluxing part of the resulting condensate to the upper portion of said distilling column, withdrawing from an intermediate point in said distilling column a liquid reflux fraction containing higher boiling point congeners, introducing said liquid reflux fraction into a fractionating column at an intermediate point, heating said fractionating column, thereby vaporizing the alcohol and lower boiling point congeners to separate them from the fusel oil constituents of the higher boiling congeners, removing from an intermediate portion of said fractionating column a fusel oil-rich fraction, separating fusel oil therefrom and returning the remainder of said fraction to the system for redistillation therein, removing vapors containing alcohol and lower boiling point congeners from the top of said fractionating column, the alcohol content of said vapors being such as to form a condensate of about 95–96 volume percent alcohol, fractionally condensing the said vapors from the fractionating column to form successive condensates, withdrawing a predetermined portion of the resulting condensates as a heads fraction to effect removal of a portion of said lower boiling point congeners from the system and returning another portion of said condensates to the upper part of said fractionating column as reflux, whereby an alcohol-containing fraction of said condensates is secured, reduced in heads, fusel oil and other congeners, and effecting redistillation of said alcohol-containing fraction together with condensate from the vapors from said distilling column to produce a final whisky distillate of reduced content of higher and lower boiling point congeners, and of 50 to 78 volume percent alcohol content, whereby substantially the entire alcohol content of the fermented mash, apart from that removed with the heads fraction and fusel oil, is included in said final whisky distillate.

GEORGE C. NEUREUTHER.

REFERENCES CITED

The following references are of record in the file of this patent:

UNITED STATES PATENTS

| Number | Name | Date |
| --- | --- | --- |
| 2,148,846 | Von Retze et al. | Feb. 28, 1939 |
| 2,290,442 | Metzl | July 21, 1942 |

OTHER REFERENCES

Text, "Chemistry and Technology of Wines and Liquors" by K. M. Herstein and T. C. Gregory, published by D. Van Nostrand Co., Inc., New York, 1935, pages 105, 120, 121, 125 and 126.

Chem. and Met. Engineering, November 1942, pages 126 to 129.